(12) United States Patent
Johnson et al.

(10) Patent No.: US 6,263,714 B1
(45) Date of Patent: Jul. 24, 2001

(54) PERIODIC GAUGE DEVIATION COMPENSATION SYSTEM

(75) Inventors: James Johnson, St. Charles, IL (US); David Knapp, Knoxville, TN (US); A. J. Johnson, St. Charles, IL (US)

(73) Assignees: Telepro, Inc., St. Charles, IL (US); Spectrum Systems Engineering, Inc., Knoxville, TN (US)

( * ) Notice: Subject to any disclaimer, the term of this patent is extended or adjusted under 35 U.S.C. 154(b) by 0 days.

(21) Appl. No.: 09/473,239

(22) Filed: Dec. 27, 1999

(51) Int. Cl.[7] ........................... B21B 37/00
(52) U.S. Cl. .................. 72/9.2; 72/10.3; 72/11.8
(58) Field of Search ............... 72/9.2, 9.4, 10.3, 72/11.8, 8.6, 11.4, 12.3

(56) References Cited

U.S. PATENT DOCUMENTS 3,763,677 * 10/1973 Mannaka et al. .............. 72/9.2
3,869,891 * 3/1975 Higham ........................ 72/9.2
3,869,892 * 3/1975 Higham et al. ................ 72/9.2
4,428,054 * 1/1984 Aizawa et al. ................ 72/9.2
4,905,491 * 3/1990 Starke et al. ................. 72/9.2
5,101,650 * 4/1992 Fapiano ....................... 72/9.2

* cited by examiner

*Primary Examiner*—Ed Tolan
(74) *Attorney, Agent, or Firm*—Wood, Phillips, VanSanten, Clark & Mortimer

(57) ABSTRACT

A control system is provided for a rolling mill that feeds sheet material from an unwind reel to a rewind reel, passing it between a pair of work rolls. The control system includes a speed sensor for sensing speed of the sheet material and a sensor for measuring material thickness. A force controller controls force exerted on the sheet material by the work rolls. A tension controller controls tension on the unwind reel. A programmed controller is operatively connected to the speed sensor, the force controller and the tension controller, and stores information representing cyclical deviations in thickness of the sheet material and controls the force controller and the tension controller using the stored information and the sensed speed.

15 Claims, 3 Drawing Sheets

PERIODIC GAUGE DEVIATION COMPENSATION SYSTEM

FIELD OF THE INVENTION

This invention relates to rolling systems for reducing thickness of a sheet material and more particularly, to a periodic gauge deviation compensation system.

BACKGROUND OF THE INVENTION

When a strip of sheet material, such as metal, web or film, must be reduced in gauge or thickness, the material is normally processed by a rolling mill. The rolling mill passes the material strip between rolling cylindrical surfaces under pressure. Ideally, the rolling mill produces a coil of sheet at a thinner and constant gauge.

A typical single stand rolling mill feeds the material from an unwind reel to a rewind reel. The material strip is passed between work rolls that are acted upon by backup rolls. A force is applied to at least one of the backup rolls. Typically, the work rolls, backup rolls and unwind and rewind reels are not perfectly cylindrical due to a number of reasons including temperature effects, wear, and mechanical inconsistencies. As a result, periodic deviations are impressed on the metal throughout the course of rolling. In addition, cyclical perturbations may have been impressed on the material sheets due to earlier processing. Periodic or cyclical perturbations in the gauge are obviously undesirable. Indeed, they constitute the most significant component of material thickness deviation in modern rolling mills. These thickness deviations are an important concern in the production of sheet, web, and film materials such as paper, plastic and metal.

The frequencies of the cyclical perturbations are a function of the rotation frequencies and associated harmonics of the mechanical components used in the rolling process. Typically, the disturbances vary at high frequencies relative to the frequency response of conventional gauge controls. This makes it difficult to eliminate their effects with standard control techniques employing measured thickness. One known solution samples exit thickness of the sheet at fixed angular intervals based on a signal read from an encoder mounted on the roll's axis. This technique synchronizes sampling to the angular displacement of the roll, insuring that the phase relationship between disturbance, measurement, and controls remains fixed. For each rotation of the roll, the fast Fourier transform of the sample signal is computed to determine the phase and magnitude of gauge disturbances at frequencies which are integral multiples of the roll revolution rate. These frequencies are set and only these frequencies are tracked. From this information, an output to control the roll separating force or work roll gap is computed to correct the eccentricity disturbance. However, such a solution requires the mounting and continued adjustment of encoders on the rolls. These systems also ignore cyclical perturbations of incoming material. Also, this solution does not correct for slippage or extrusion occurring in the process which then results in phase shifts. This can cause the rolling mill to actually add to the problem, rather than correct the problem.

The present invention is intended to solve one or more of the problems discussed above in a novel and simple manner.

SUMMARY OF THE INVENTION

In accordance with the invention, there is provided a rolling mill control system that removes or eliminates cyclical disturbances from a sheet or web by applying digital signal processing techniques to identify instantaneous and long term values of frequencies, magnitudes and phase angles of the disturbances. This system does not require the use of angular position encoders on the target rolls. Instead, the control scheme is based on material speed through the mill. The information about cyclical disturbances is processed to develop a set of compensating control signals which, when applied to process actuators, significantly attenuate or eliminate disturbances from the delivered product.

Broadly, a control system is provided for a rolling mill that feeds sheet material from an unwind reel to a rewind reel, passing it between a pair of work rolls. The control system includes a speed sensor for sensing speed of the sheet material. A force controller controls force exerted on the sheet material by the work rolls. A tension controller controls tension on the reels. A programmed controller is operatively connected to the speed sensor, the force controller and the tension controller, and stores information representing cyclical deviations in thickness of the sheet material and controls the force controller and the tension controller using the stored information and the sensed speed.

It is a feature of the invention that the force controller is operated to correct for work gap deviations caused by disturbances occurring in the current material pass. The force and tension controllers are operated to correct for deviations in incoming material.

It is another feature of the invention that a thickness gauge is connected to the programmed controller for sensing thickness of sheet material and the programmed controller generates the stored information responsive to the sensed thickness. The programmed controller uses a time series of the sensed thickness to detect the cyclical deviations.

It is a further feature of the invention that the programmed controller detects frequency, magnitude and phase changes in the cyclical deviations and adjusts control of the force controller and the tension controller responsive to detected frequency, magnitude and phase changes.

Further features and advantages of the invention will be readily apparent from the specification and from the drawings.

DETAILED DESCRIPTION OF THE INVENTION

Figure 1:
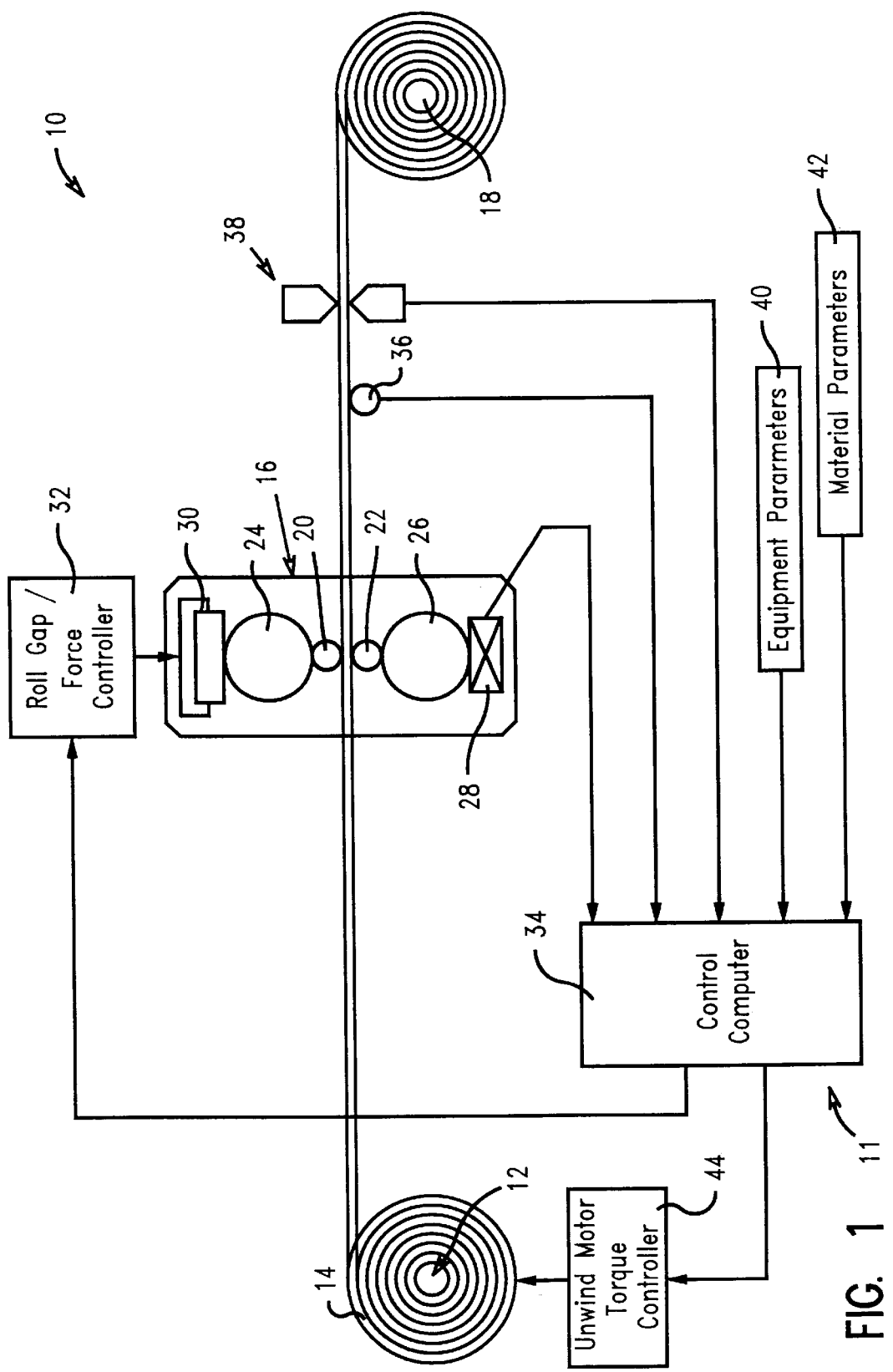
FIG. 1 is a generalized block diagram illustrating a periodic gauge deviation compensation system in accordance with the invention used with a single stand rolling mill.

Referring to FIG. 1, a single stand rolling mill 10 includes a periodic gauge deviation compensation control system 11 in accordance with the invention. The rolling mill 10 includes a strip uncoiler or unwind reel 12 holding a coil of sheet material 14. The sheet material 14 is fed through a rolling mill stand 16 to a strip recoiler or rewind reel 18. The rolling mill stand 16 includes first and second work rolls 20 and 22 on opposite sides of the sheet material 14. Opposite each respective first and second work roll 20 and 22 from the sheet material 14 is a respective first and second backup roll 24 and 26.

A single stand rolling mill is illustrated and described herein for simplicity and ease of understanding. The features of the invention can also be used for multi-stand rolling mills as well as other single and multi-stand processing techniques. Also, the invention is applicable to stacks with more or fewer than four total rolls, i.e., 6-high stacks.

Operatively associated with the second backup roll 26 is a load cell 28 for providing a force measurement. A gap/force actuator 30 acts on the first backup roll 24 to adjust gap between the work rolls 20 and 22 to adjust gauge of the sheet material 14. The gap/force actuator 30 is controlled by a roll gap/force controller 32 operated by a control computer 34. The control computer 34 receives the force measurement from the load cell 28. Also connected to the control computer 34 is a tachometer or other speed sensing device 36 sensing speed of the sheet material 14 downstream of the rolling stand 16 and a thickness gauge 38 also downstream of the rolling mill stand 16. Additional inputs to the control computer 34 relate to equipment parameters represented by a block 40 and material parameters represented by a block 42. These parameters can be downloaded software values or manually entered by an operator and stored in memory. The control computer 34 comprises a microprocessor or digital signal processor or the like implementing control programs stored in an associated memory, in a conventional configuration, to control the force controller 32 and an unwind motor torque controller 44 which controls torque on the strip uncoiler 12. Although not shown, the torque controller 44 could also, or alternatively, control torque on the rewind reel 18. The control computer uses the speed, thickness, and force inputs along with the equipment and engineering parameters to develop output control signals for the controllers 32 and 44 to attenuate or eliminate disturbances from the delivered sheet material 14.

As is apparent, the control system 11 does not require use of encoders on the rolling mill stand 16 or other material handling equipment to determine angular positions. Measurements used to estimate frequency, magnitude and phase angle of eccentricity disturbances are acquired at intervals based on material speed rather than at fixed time intervals or encoder output signals as in previous systems. This enables the control system 11 to estimate cyclic perturbations without concern for speed changes in the process. As a result the control system 11 tracks cyclical disturbances and provides eccentricity compensation during line speed changes, as well as at steady state operation.

Particularly, the control system 11 isolates and identifies all cyclic perturbations impressed in the sheet material 14. These perturbations may be due to incoming product variations and/or added by the current processing. The control system 11 uses both actual measurements of cyclical disturbances, such as thickness deviation and force signals, and previous correction outputs, to calculate estimates of theoretical uncorrected material deviations and determine future correction outputs. These signals are used in combination to enhance the frequency, magnitude and phase of the control signals in order to eliminate the eccentricity disturbances. The control system 11 operates in a learn mode which provides for automatic calculation of various parameters, including material transport delay, disturbance phase angle, and sensitivity factors, as a function of material speed. This allows the system to automatically self-calibrate.

While the disclosed system is used in connection with metal sheet material, the control system 11 could be used to eliminate cyclical disturbances in paper and plastic film production. The control system 11 could also be used to identify the frequency, magnitude and/or phase components of cyclical disturbances during production for diagnostic purposes.

The control system 11 isolates all cyclical perturbations impressed on the material sheet 14. The control system 11 can differentiate those perturbations originating in the incoming sheet from those added by the rolling equipment. It also allows selection of which cyclical perturbations are to be eliminated. Different correction algorithms may be used to correct for incoming product deviations versus those originating in the rolling equipment.

The frequencies, magnitudes, and angular positions, i.e., phase angles, of the cyclical perturbations are determined from direct measurement of cyclical disturbances in the sheet and measured by the thickness gauge 38 and speed of the process measured by the tachometer 36. The control computer 34 determines the frequencies, magnitudes, and angular positions of these perturbations. This information is used to predict perturbations expected to be impressed on the sheet 14 if no corrections were made. The control computer 34 provides signals to the force controller 32 and the torque controller 44 to eliminate future gauge deviations. Continuous measurement of the cyclical disturbances, combined with the calculated output corrective signals, are used to insure that proper corrective signals continue to be calculated and supplied to the rolling compensation system. This includes constant phase angle adjustment of the corrective signals with respect to the disturbances being targeted, thus eliminating the need for angular position encoders on the mechanical components.

In the illustrated embodiment of the invention, the control computer 34 provides control signals for two controllers, namely the force controller 32 and the torque controller 44. In accordance with the invention, the control computer 34 could be used to develop additional control signals, as necessary or desired, such as a rewind torque controller, as described more particularly below.

Prior to processing a coil of the material 14 at a given mill, several mechanical dimensions and other parameters associated with the product being rolled, and the process equipment itself, are known. These parameters can include the following:

diameters of work and backup rolls,
diameters of sheet deflector rolls, bridle rolls, etc.,
diameters of unwind and rewind reels,
distance from uncoiler mandrel to roll bite,
distance from roll bite to thickness measuring device,
distance from roll bite to rewind mandrel,
unwind, rewind, and main stand drive gear ratios,
dynamic response characteristics of various sensors and actuators,
scheduled material entry and exit thickness (nominal),
initial diameter of unwind coil,
nominal strip width,
scheduled entry and exit strip tension stresses (nominal), and
material hardness (yield stress).

An operator selects which potential cyclical disturbances will be targeted for compensation. These selections may be made using engineering judgement, production history, local operating practice, et cetera.

The parameters discussed above are used both before and during rolling to determine sampling rates for measured disturbance signals, such as delivery thickness disturbance and/or roll separating force. In the illustrated embodiment of the invention, the sampling rates are expressed in terms of samples per unit sheet length. The parameters are also used to determine instantaneous values of expected frequencies associated with each possible cyclical disturbance source during the rolling operation. These sources include the individual work rolls 20 and 22, the backup rolls 24 and 26, the unwind coil 12 and rewind coil 18, deflector rolls, incoming material, et cetera. The parameters are also used to determine material transport delays from unwind to roll bite, roll bite to thickness measuring device, and roll bite to rewind. Finally, the parameters can be used to determine phase delays between actuator movements and measured disturbances.

Sheet thickness deviation, rolling force variations, and other process measurements are sampled during rolling. The sampling frequency is constantly adjusted as a function of material speed to yield measurements corresponding to fixed length intervals along the sheet material 14. Consequently, as line speed increases, the sampling frequency in samples per second increases, although the number of samples per linear distance along the sheet material 14 remains the same. The control system 11 tracks the targeted disturbance sources, such as an individual roll or reel, using the predicted frequency of the cyclical variation it produces.

The sampling process using the sensed parameters produces a discrete time series.

This time series, in combination with the past control outputs, is processed by specialized digital filters in the control computer 34 to extract estimates of the frequencies of all cyclical disturbances in the measurements. The knowledge that the signal consists only of a discrete set of sinusiods corrupted by white noise improves the accuracy and resolution of frequency estimates. Furthermore, the identified frequencies are not necessarily fixed but instead may shift throughout the course of processing a single sheet 14. The algorithms implemented in the control computer 34 are capable of tracking each of these frequencies as they vary and continually update estimates of their respective phases and magnitudes based on past values and current inputs.

For each disturbance frequency targeted for compensation a control action is computed by the control computer 34. This process involves producing a correction signal at the disturbance frequency that is correctly matched to the magnitude and phase angle of the disturbance. This matching takes into account material properties, mill operating conditions, material transport delay, and the dynamic characteristics of the sensed parameters and actuators. Finally, the individual corrective control actions for each of the targeted frequencies are combined to produce a single error-correction control signal for each actuator controller. In effect, the corrections of each of the frequencies are superimposed onto individual actuator controllers.

Cyclical exit thickness disturbances that originate in the present processing paths are typically caused by roll gap variations due to roll and bearing eccentricities. These disturbances are most effectively corrected by changing only the roll gap/force actuator 30. Thus, gap variations are corrected at their source by corresponding gap actuator movements. Exit thickness disturbances originating in the incoming material are most effectively corrected by simultaneous gap and entry sheet speed changes. Entry sheet speed affects exit thickness due to the fact that the mass flow of material through a rolling mill (mass per unit time) must be conserved. That is, the mass flow rate at the mill exit must match that at the mill entry and vice versa, as mass is neither created nor consumed in the rolling process. In order to maintain constant exit thickness and speed in the presence of entry thickness variations, the entry sheet speed must change so as to maintain constant mass flow at the mill exit. Consequently, control system performance is enhanced if incoming material disturbances are corrected by a combination of gap and entry sheet speed changes.

The signal processing techniques implemented in the control computer 34 differentiate between cyclic disturbances originating in the incoming material and those originating in the present processing paths. This allows the most appropriate correction strategy to be employed for each disturbance.

Figure 2A:
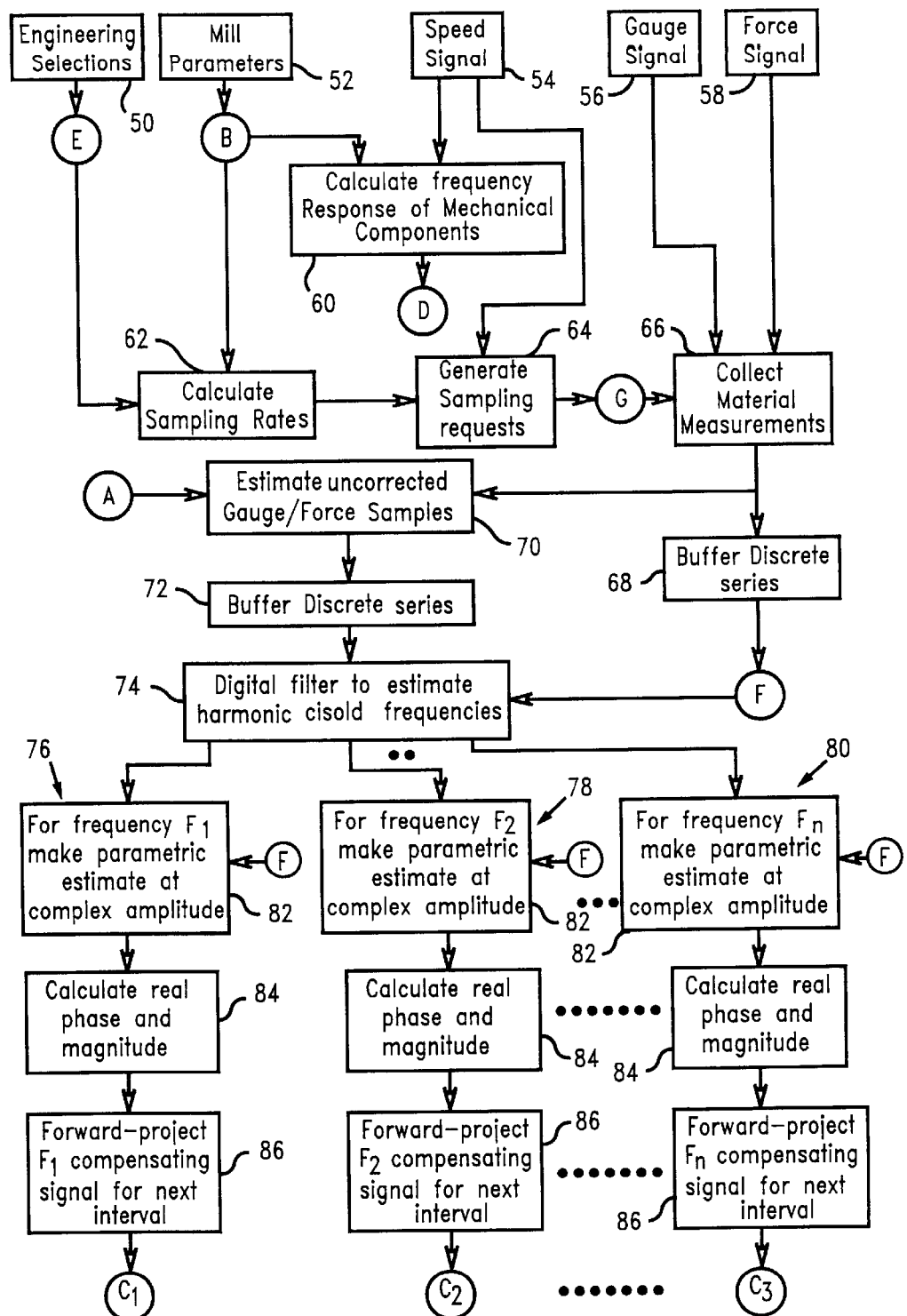
FIGS. 2A and 2B comprise a flowchart illustrating a control scheme for operating the rolling mill of FIG. 1.
Figure 2B:
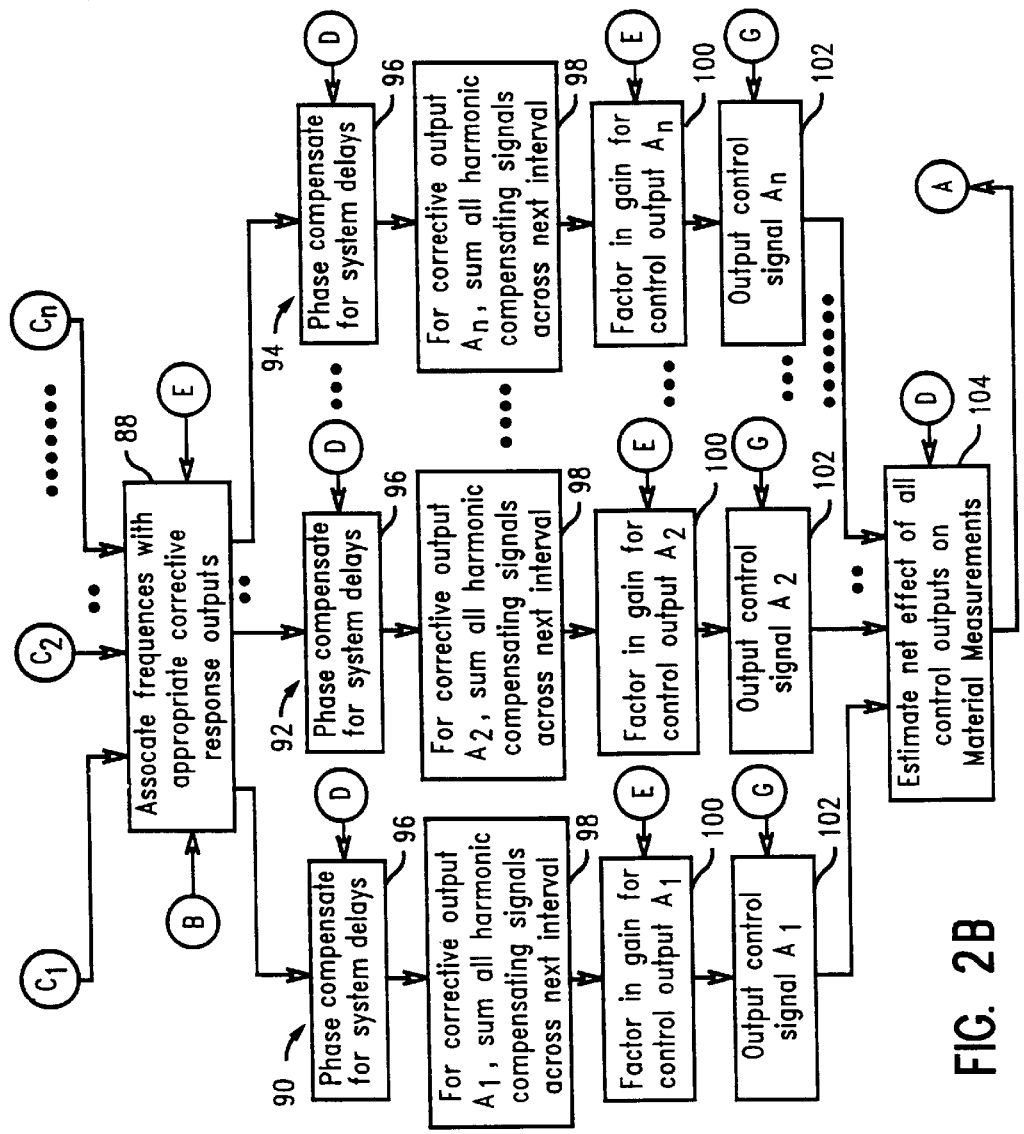

Referring to FIGS. 2A and 2B, a flow diagram illustrates operation of the control system 11. Some of the steps are implemented manually, such as entering the parameters discussed above, or other pre-calculated values. Other of the steps are implemented automatically in the control computer 34, as will be apparent.

The flow diagram includes a series of five blocks 50, 52, 54, 56 and 58, representing the inputs to the control computer 34 corresponding generally to those illustrated in FIG. 1. The block 50 represents engineering selections entered by an operator or production engineer or the like. These selections include the maximum number of sinusoids to track, the maximum possible speed of the mill, control output gain factors, and other system settings. The block 52 represents mill parameters. These parameters include physical parameters of the mill stand 16, unwind reel 12, rewind reel 18, and all other mechanical components. The block 54 represents the speed signal from the tachometer 36. The block 56 represents the thickness gauge signal from the thickness gauge 38. The block 58 represents force signal from the load cell 28.

The mill parameters from the block 52 are applied to a node B and to a block 60. The block 60 also receives the speed signal from the block 54. The block 60 calculates frequency response of mechanical components. This includes calculating the magnitude response and phase delay of each component based on current speed. Particularly, the user initially calculates theoretical frequency response as a function of speed. The actual frequency response is then adjusted based on sensed speed. The output of the block 60 is applied to a node D. The engineering selections at the block 50 are applied to a node E and to a block 62. The block 62 also receives the mill parameters from the block 52. The block 62 calculates sampling rates. This consists of deciding on the optimal sampling rates given the engineering selections 50 and the mill parameters 52. A block 64 receives the sampling rates from the block 62 and the speed signal from the block 54 to generate sampling requests. This produces sampling interrupts for the calculated sampling rates based on mill speed. The output of the block 64 is applied to a node G and to a block 66. The block 66 also receives the gauge signal 56 and the force signal 58. The block 66 collects material measurements by reading the signal from the thickness gauge 38 and the load cell 28 to record the current values. The current values are applied to a buffer discrete series block 68 to record the history of measured actual samples. The measurements are also applied to a block 70. The block 70 also receives a signal from a node A, developed below, that represents effects of the control outputs. The block 70 estimates the uncorrected gauge and force samples given the current readings and the estimates of what changes previous control outputs have effected on the sheet 14. That is, block 70 also estimates what the samples would have been if no mill control had acted on the sheet 14. The output of the block 70 is applied to a buffer discrete series block 72 that records the history of estimated uncorrected samples.

The measured samples from the block 68 and the history of estimated uncorrected samples from the block 72 are supplied to a digital filter block 74. The digital filter block 74 estimates harmonic cisoid frequencies. The cisoid frequencies represent complex sinusoids, as is known. The digital filter uses any one of a number known harmonic frequency detection algorithms. One example is Pisarenko's method that estimates individual harmonic frequencies present in the sample series. Each estimated individual harmonic frequency is then acted on individually in respective rows 76, 78 and 80 of processing blocks. Each of the rows 76, 78 and 80 is identical, other than acting upon a different frequency. Particularly, the row 76 relates to a first frequency $F_1$, while the row 78 relates to a second frequency $F_2$. The row 80 represents an additional frequency $F_n$. As is illustrated by the dotted lines, additional rows are used according to the number of frequencies sensed. Each frequency is described herein as $F_x$.

A block 82 makes parametric estimates of complex amplitudes for the frequency $F_x$. This is done by using a parameter estimation technique such as the maximum likelihood method to estimate the associated cisoids' complex amplitude. A block 84 then calculates the real phase and magnitude given the complex amplitude associated with each cisoid. A block 86 then forward-projects an $F_x$, compensating signal for the next interval. This is done by predicting the appropriate control response to compensate for each of the individual cisoids based on their harmonic nature. The control response must be calculated for the interval between the current sample and the next sample in the future. The various calculated values are then applied via a node $C_x$ to a block 88 shown in FIG. 2B. The block 88 also receives the mill parameters from the node B, discussed above, and the engineering selections from the node E, also discussed above.

The block 88 combines the targeted frequencies and associates these frequencies with appropriate corrective response outputs. This is done by choosing the best control output for each detected cisoid. In the illustrated embodiment of the invention, this comprises adjusting the most appropriate combination of tensions using the torque controller 44 and roll gap/force using the controller 32 for the type of cyclical disturbances being targeted. Particularly, a combination of the torque controller 44 and the gap/force controller 32 might be used to correct for entry thickness variations, while the gap/force controller 32 might be used alone for roll stack eccentricity disturbances. The categorical selection is done during set-up of the process. The control computer 34 separates the disturbance frequency components, associates them with their corresponding sources, and selects the particular outputs to be used for correcting each one. Thus, the block 88 groups together all frequencies that will be controlled by unwind/rewind tension, and all frequencies that will be controlled by roll gap, et cetera.

Control output processing for each controller is illustrated in parallel in rows 90, 92, and 94. Each row is generally identical in operation. Each row relates to a particular control signal. In the illustrated embodiment, a control signal $A_1$ is used for the torque controller 44, and a control output $A_2$ is used for the force controller 32. Additional control signals $A_n$ are available for use if additional controlled actuators are used.

A block 96 also receives the frequency response from the block 60 of FIG. 2A via the node D. The block 96 provides phase compensation for system delays. This is based on the mechanical parameters and the estimated frequency response of all mechanical components associated with a given response control, such as unwind/rewind tension or roll gap, and compensates the phase of the corrective signal corresponding to each frequency. A block 98 for a corrective output $A_x$ sums all the harmonic compensating signals across the next interval. In other words, for each of the possible control outputs all of the compensating signals associated with that output are summed together. This creates a single output signal to drive each of the controlling outputs between the current time and the next input sample. A block 100 also receives the engineering selections from the block 50 and factors in gain for the control output $A_x$. This attenuates or amplifies the resulting signal for each of the control outputs by the appropriate gain constant. A block 102 also receives the sampling requests from the block 64 of FIG. 2A via the node G and outputs the control signal $A_x$ to drive the output signal for the torque controller 44 or the force controller 32, et cetera. A block 104 receives the output control signals from $A_x$ from each row 90, 92 and 94, as well as the frequency response from the block 60 and estimates the net effect of all control outputs on material measurements given each of the control outputs, and calculates the expected net effect they will have on future material measurements. These estimates are applied via the node A to the block 70, discussed above, to help calculate estimates of uncorrected samples given their measured values, as discussed above.

Thus, in accordance with the invention, the control system uses specialized digital signal processing algorithms to yield estimates of component frequency, magnitude and phase that are more discriminating than traditional techniques. Moreover, the removal of encoders from the system provides several advantages. First, the control system is free to estimate any frequency, not just those matched to the roll rotation speeds. Furthermore, the system is not reliant on encoders for phase synchronization, but instead employs iterative estimates of disturbance phase angles to assure that corrective actions are always properly matched to the disturbance phase.

Because the disclosed algorithms are advanced beyond necessitating encoders, and thus are capable of detecting and tracking any frequency, the disclosed system is capable of correcting for cyclical disturbances originating in the incoming material. The digital signal processing techniques allow for feedback control to be successful at removing incoming cyclical material disturbances. This is unlike conventional systems that can only remove these disturbances using feed forward control.

By incorporating the estimated disturbance phase angle into the control algorithm the system has the capability to continuously tune the phase component of the corrective control action as well as its magnitude.

What is claimed is:

1. A control system for a rolling mill that feeds sheet material from an unwind reel to a rewind reel, passing it between a pair of work rolls, the control system comprising:

a speed sensor for sensing speed of the sheet material;

a force controller controlling force exerted on the sheet material by the work rolls;

a tension controller controlling tension on one of the reels; and a programmed controller operatively connected to the speed sensor, the force controller and the tension controller, and storing information representing cyclical deviations in thickness of the sheet material and controlling the force controller and the tension controller using the stored information and the sensed speed.

2. The control system of claim 1 wherein the force controller is operated to correct for work gap deviations caused by disturbances occurring in the current material pass and the force and tension controllers are operated to correct for deviations in incoming material.

3. The control system of claim 1 further comprising a thickness gauge connected to the programmed controller for sensing thickness of sheet material and the programmed controller generates the stored information responsive to the sensed thickness.

4. The control system of claim 3 wherein the programmed controller uses a time series of the sensed thickness to detect the cyclical deviations.

5. The control system of claim 1 wherein the programmed controller detects frequency, magnitude and phase changes in the cyclical deviations and adjusts control of the force controller and the tension controller responsive to detected frequency, magnitude and phase changes.

6. A control system for a rolling mill that feeds sheet material from an unwind reel to a rewind reel, passing it between a pair of work rolls, the control system comprising:

a speed sensor for sensing speed of the sheet material;

a thickness gauge for sensing thickness of sheet material; and a programmed controller operatively connected to the speed sensor, and the thickness gauge, and detecting cyclical deviations in thickness of the sheet material and determining if the deviations are produced by the rolling mill or were present in the incoming sheet material.

7. The control system of claim 6 further comprising a force controller controlling force exerted on the sheet material by the work rolls, a tension controller controlling tension on one of the reels, and the programmed controller is operatively connected to the force controller and the tension controller, and controls the force controller and the tension controller using the detected deviations and the sensed speed.

8. The control system of claim 7 wherein the force controller is operated to correct for work gap deviations caused by disturbances occurring in the current material pass and the force and tension controllers are operated to correct for deviations in incoming material.

9. The control system of claim 6 wherein the programmed controller uses a time series of the sensed thickness to detect the cyclical deviations.

10. The control system of claim 7 wherein the programmed controller detects phase changes in the cyclical deviations and adjusts control of the force controller and the tension controller responsive to detected phase changes.

11. The method of controlling a rolling mill that feeds sheet material from an unwind reel to a rewind reel, passing it between a pair of work rolls, the method comprising the steps of:

sensing speed of the sheet material;

storing information representing cyclical deviations in thickness of the sheet material; and controlling force exerted on the sheet material by the work rolls using the stored information and the sensed speed.

12. The method of claim 11 further comprising the step of controlling tension on one of the reels using the stored information and the sensed speed.

13. The method of claim 12 wherein the force controlling step corrects for work gap deviations caused by disturbances occurring in the current material pass and the force and tension controlling steps together correct for deviations in incoming material.

14. The method of claim 11 further comprising the step of sensing thickness of sheet material and the stored information is generated responsive to the sensed thickness.

15. The method of claim 11 further comprising the steps of detecting phase changes in the cyclical deviations and adjusting force and tension responsive to detected phase changes.

* * * * *